(12) United States Patent
Croux et al.

(10) Patent No.: US 10,708,869 B2
(45) Date of Patent: Jul. 7, 2020

(54) HETEROGENEOUS DOWNHOLE ACOUSTIC NETWORK

(71) Applicant: SCHLUMBERGER TECHNOLOGY CORPORATION, Sugar Land, TX (US)

(72) Inventors: Arnaud Croux, Cambridge, MA (US); Julius Kusuma, Arlington, MA (US); Stephane Vannuffelen, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 375 days.

(21) Appl. No.: 15/419,544

(22) Filed: Jan. 30, 2017

(65) Prior Publication Data

US 2018/0220380 A1    Aug. 2, 2018

(51) Int. Cl.
| | |
|---|---|
| H04W 52/24 | (2009.01) |
| H04W 40/00 | (2009.01) |
| H04W 56/00 | (2009.01) |
| H04L 5/00 | (2006.01) |
| H04L 5/14 | (2006.01) |
| H04L 27/00 | (2006.01) |

(52) U.S. Cl.
CPC ......... *H04W 52/244* (2013.01); *H04L 5/0055* (2013.01); *H04L 5/1469* (2013.01); *H04L 27/00* (2013.01); *H04W 40/005* (2013.01); *H04W 56/002* (2013.01); *H04B 2215/061* (2013.01); *Y02D 70/00* (2018.01)

(58) Field of Classification Search
CPC combination set(s) only.
See application file for complete search history.

(56) References Cited

U.S. PATENT DOCUMENTS

| | | | |
|---|---|---|---|
| 8,605,548 B2 | 12/2013 | Froelich | |
| 9,062,535 B2 | 6/2015 | Merino et al. | |
| 2004/0262008 A1* | 12/2004 | Deans | E21B 41/0007 166/339 |
| 2006/0221768 A1* | 10/2006 | Hall | G01V 1/40 367/82 |

(Continued)

OTHER PUBLICATIONS

International Search Report and Written Opinion for corresponding International Application Serial No. PCT/US2018/015630, dated Jun. 21, 2018, 17 pages.

*Primary Examiner* — Edan Orgad
*Assistant Examiner* — Nourali Mansoury

(57) ABSTRACT

An acoustic network is located in a formation traversed by a borehole having a pipe contained therein. The acoustic network includes a backbone network having a number of backbone modems engaging the pipe and acoustically communicating along the pipe using a first modulation technique. A number of end node modems acoustically communicate using a second modulation technique orthogonal to the first modulation technique. At least one of the backbone modems is a bridge hub modem that is coupled to both the backbone network and an end node modem and communicates with the backbone network using the first modulation technique and with the end node modem using the second modulation technique. The end node modems may have a hibernation mode defined by low energy usage with no transmission or receipt of data, and a transmission mode defined by transmission of data by the end node modem.

26 Claims, 8 Drawing Sheets

(56) References Cited

U.S. PATENT DOCUMENTS

| | | | |
|---|---|---|---|
| 2007/0008916 A1* | 1/2007 | Haugli | H04B 7/2041 370/320 |
| 2011/0050452 A1 | 3/2011 | Kusuma et al. | |
| 2011/0205847 A1 | 8/2011 | Lemenager | |
| 2013/0278432 A1 | 10/2013 | Shashoua et al. | |
| 2014/0269188 A1* | 9/2014 | van Zelm | E21B 47/12 367/81 |
| 2015/0077265 A1* | 3/2015 | Gao | E21B 47/16 340/853.7 |
| 2016/0047236 A1 | 2/2016 | Croux | |
| 2016/0356152 A1 | 12/2016 | Croux et al. | |
| 2018/0123839 A1* | 5/2018 | Chung | H03M 5/02 |

\* cited by examiner

HETEROGENEOUS DOWNHOLE ACOUSTIC NETWORK

TECHNICAL FIELD

The subject disclosure relates to wireless acoustic telemetry systems for use with installations in oil and gas wells or the like. More particularly, the subject disclosure relates to systems and methods for communicating data between equipment in a wellbore and equipment at the surface of an earth formation.

BACKGROUND

During and after the drilling of a borehole in a geological formation, certain types of downhole testing are performed in a blind fashion where downhole tools and sensors are deployed in the borehole at the end of a tubing string for several days or weeks, after which time they are retrieved to the surface. During the downhole testing operations, sensors may record measurements that will be used for interpretation. Only after retrieval to the surface does the operator ascertain whether the data obtained downhole are sufficient for the operator's purposes. In addition, while the operator may attempt to operate and control some of the downhole testing tools such as tester valves, circulating valves, packers, samplers, and perforating charges, from the surface, the operator typically cannot obtain direct feedback from the downhole tools.

While two-way communication between the surface and the downhole tools may be beneficial, such communication may be difficult to provide using a cable, as locating the cable inside of the tubing string limits flow diameter, and complex structures may be required to pass the cable from inside to the outside of the tubing. In addition, space outside the tubing is limited and cable can easily be damaged. As a result, wireless telemetry systems have value.

There are three major methods of wireless data transfer between downhole and uphole equipment: mud pulse telemetry, electromagnetic telemetry, and acoustic telemetry. Mud pulse telemetry is commonly used during drilling operations where there is mud flow in the borehole. However, whenever mud is not flowing, mud pulse telemetry cannot be utilized. In addition, mud pulse telemetry data rates are slow. Electromagnetic telemetry does not require mud flow, but does require a large amount of power. Moreover, electromagnetic telemetry is subject to noise and its success is very dependent on the formation in which the borehole is located. Acoustic telemetry is likewise not dependent on mud flow but is subject to noise, attenuation, and signal distortion due to reflections at pipe connections. Data throughput is also very limited (slow).

In order to overcome some of the issues with acoustic telemetry, and as seen in prior art FIG. 1 and FIG. 2, a linear network of acoustic modems 10 has been used to transfer data from downhole equipment 20 to the surface 30 and to transmit control information downhole. A typical bidirectional communication system may include several modems, e.g., 10a, 10b..., that are spaced apart along a pipe 50 and engaging (e.g., clamped to) the pipe. The modems typically include receiver and transmitter electronics 60 which are acoustically coupled to the pipes 50 by a piezostack 65, microprocessors 70, and a battery power source 80 for powering the modem as disclosed in U.S. Pat. No. 8,605,548 to Froelich, and U.S. Pat. No. 9,062,535 to Merino et al., both of which are hereby incorporated by reference herein in their entireties. While these disclosures provide important advances in overcoming noise, attenuation, and signal distortion issues, data throughput is still considered very limited in the prior art acoustic telemetry systems. In addition, because the prior art acoustic telemetry systems rely on battery power, typical systems are functional for only a couple of weeks to a month. While this signaling system life-span may be sufficient for certain testing environments, it is not sufficient for enabling signaling to continue during production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Downhole acoustic telemetry systems and methods are provided. The downhole acoustic telemetry system includes a backbone network that includes a number of modems clamped onto a pipe and communicating using a first modulation technique, and a plurality of end node modems (for local nodes) communicating using a second modulation technique orthogonal to the first modulation technique. At least one of the backbone modems is a bridge hub modem that is coupled to both the backbone and to at least one end node and communicates with the backbone using the first modulation technique and with the end node using the second modulation technique.

According to one aspect, in an acoustic system, when frequency division multiplexing is used, the apparatus (modems) may use multiple transducers, each tuned to one or several frequency ranges, in order to improve overall efficiency.

In one embodiment, the end node modems operate in a plurality of modes including at least a hibernation or sleep mode and a transmit mode, and optionally, a receive mode.

In one embodiment, end node modems are provided with the ability to communicate with each other independently of the backbone network.

In one embodiment, each of the backbone modems are provided with a battery for powering the backbone modems and each of the end node modems is provided with a battery for powering the end node modems, with the batteries of the end node modems being considerably smaller and having considerably smaller energy storage than the batteries of the backbone modems.

In one embodiment, the backbone network includes an uplink network and a downlink network using different modems in the backbone. In another embodiment, the backbone network uses an uplink frequency band and a downlink frequency band, with each node in the backbone including two transducers; one for each frequency band.

In one embodiment, local nodes, typically associated with sensors, communicate with local nodes and with bridge hubs. In one aspect, the bridge hubs may include local processing capabilities as well as local memory storage. The bridge hubs can receive messages from the surface via the backbone network and pass them to the local nodes through the local network and/or can trigger a sequence of queries on the local network. The local nodes can then pass an answer back to the bridge hub through the same local network. The bridge hub can then transmit the answer back to the surface through the backbone network.

In another embodiment, the bridge hub can harvest data from the local nodes and store the data at the bridge hub.

When a query from the surface for a local node is received by the bridge hub via the backbone network, the bridge hub can supply the data without passing the query to the local node.

Different implementations may be utilized for querying. For example, a bridge hub may send a "wake" signal to all local nodes which synchronizes the nodes. The nodes may then use a time division multiplexing scheme to send any data they may have to the bridge hub. As another example, local nodes transmit data at a random time.

Additional aspects, embodiments, objects and advantages of the disclosed methods may be understood with reference to the following detailed description taken in conjunction with the provided drawings.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 1:
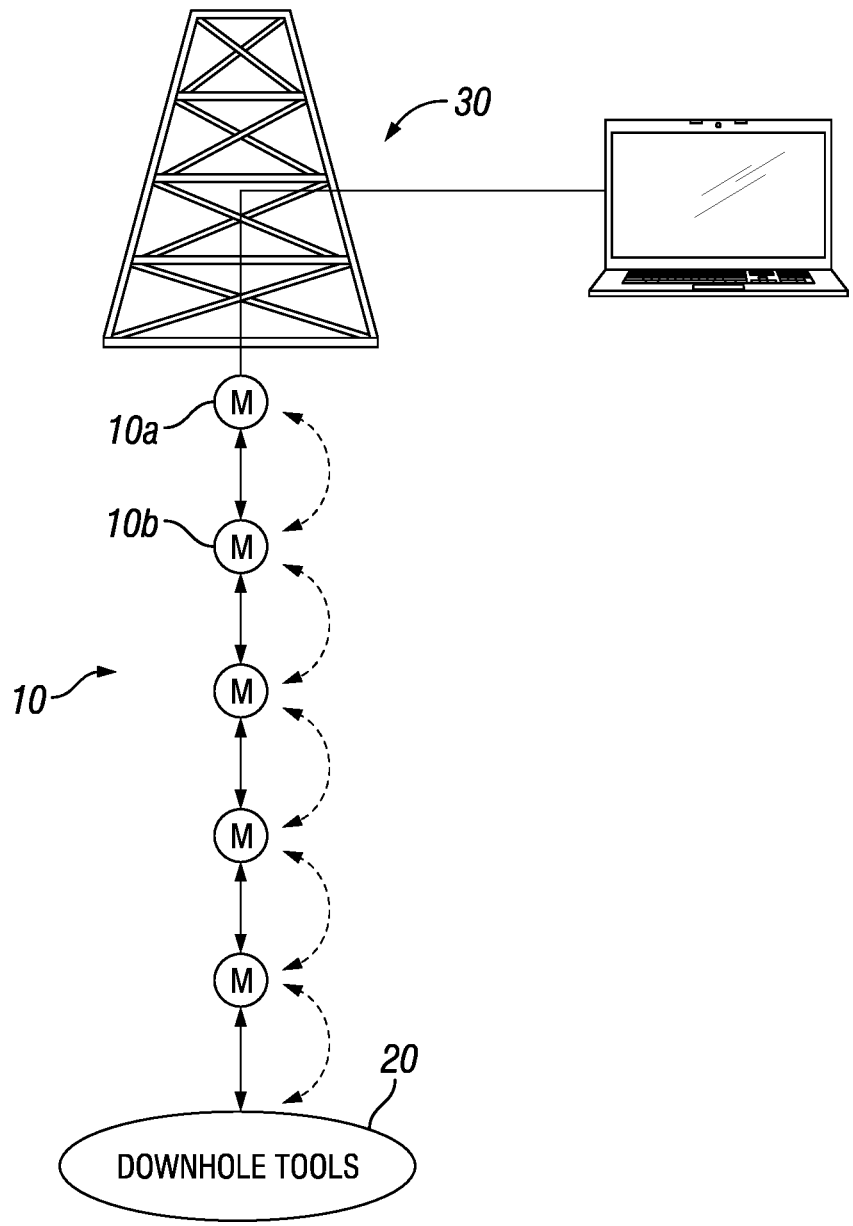
FIG. 1 is a prior art schematic of a telemetry system.
Figure 2:
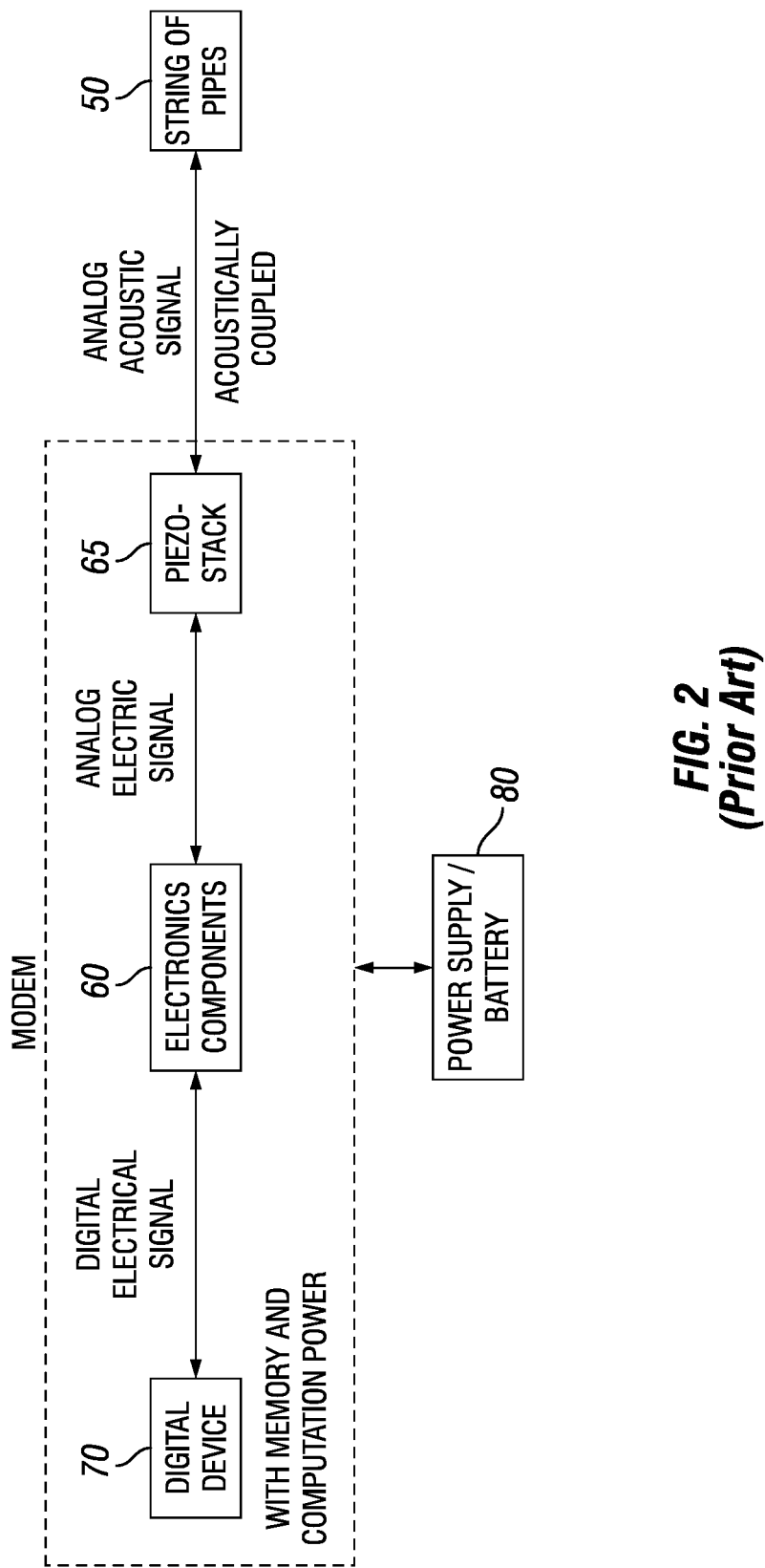
FIG. 2 is a prior art schematic of a modem of the telemetry system of FIG. 1.
Figure 3:
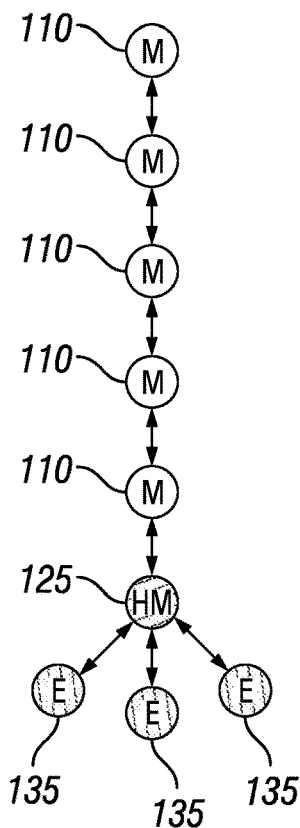
FIG. 3 is a schematic of one embodiment of heterogeneous downhole acoustic network with backbone modems, a hub modem, and end node modems.

A schematic of one embodiment of heterogeneous downhole acoustic network with backbone modems 110, a hub modem 125 and end node modems 135 is seen in FIG. 3. The backbone modems may be configured substantially as previously described with respect to prior art FIGS. 1 and 2, and each typically includes receiver and transmitter electronics, a (micro)processor and a battery power source.

The receiver and transmitter electronics are acoustically coupled by a piezostack to a pipe located in a borehole traversing the earth formation. In one embodiment, the pipe is a drill pipe that is used as part of a drill string during the drilling operation. The drill pipe rotates a drilling tool during the drilling operation. The heterogeneous downhole acoustic network can be used to communicate along the drill string between a surface location and the drilling tool. In another embodiment, the pipe is casing that is used as part of a well completion. The heterogeneous downhole acoustic network can be used to communicate along the casing between or amongst a surface location, sensors, completion elements, and valves.

The backbone modems 110 function to linearly repeat acoustic messages being sent from the surface to the hub modem 125 and from the hub modem 125 to the surface. In one embodiment, described hereinafter with reference to FIG. 6, the backbone modems 110 may be split into interlaced networks functioning in different frequency bands so that messages may be transmitted up and down the backbone simultaneously.

The hub modem 125 is in many ways similar to a backbone modem, except that the hub modem communicates with a backbone modem 110 using a first modulation technique and with the end node modems 135 using a second modulation technique orthogonal to (e.g., having little to no interference with) the first modulation technique.

Orthogonality may be obtained using various techniques such as frequency multiplexing with separate communication bandwidths (e.g., orthogonal frequency division multiplexing (OFDM)), spread spectrum multiplexing, time multiplexing with dedicated communication time slots (e.g., time division multiplexing (TDM)), acoustic mode selection, and other orthogonal coding techniques. For purposes herein, when two signals can be decoded without significant interference between them, they are said to be orthogonal.

Thus, the hub modem acts as a gateway between the backbone modem network and the local or end node modems 135. As such, the hub modem 125 may include local processing capabilities as well as local memory storage. For example, the hub modem 125 may receive information from multiple end node modems 135 which could represent pressures and/or temperatures and/or other information from sensors (nodes) to which the end node modems are coupled. The information from the multiple end node modems 135 may then be processed and/or packaged in a single message for delivery uphole (via the backbone modems). In some embodiments, such as described hereinafter with reference to FIG. 5, the hub modem 125 may be used as a controller for a local network of end node modems.

In some embodiments, the hub modem includes two transducers and two microprocessors, memories, etc. which are connected to each other. Each transducer can be designed to provide an optimal sensitivity to a single telemetry mode (modulation technique) so that orthogonality is reinforced. Thus, one transducer and accompanying microprocessor, etc. acts as a modem in the backbone network and the second acts as a modem in the local network. In one embodiment, connection between the transducers may be a wire using a standard protocol such as RS485. In one embodiment, each transducer and accompanying microprocessor, memory, etc. unit is provided with its own battery. In another embodiment, separate batteries are provided.

In some embodiments, the hub modem includes a single transducer with accompanying electronics where the transducer is sufficiently wideband so that it can receive and transmit acoustic messages in both networks. The electronics should be able to handle parallel messages at the same time.

Other embodiments for the hub modem include the use of two transducers with common electronics, or one transducer with separate electronics components utilizing differentiating filtering.

While the circuitry of the end modems 135 is similar to the circuitry of the backbone modems, the end node modems 135 are different than the backbone modems on several accounts. First, the end node modems 135 communicate with a wireless modulation technique that is orthogonal to the modulation technique of the backbone modems. By way of example, the frequency band of the end node modems 135 may be selected to be non-interfering with the frequency band of the backbone modems. Second, the end node modems 135 are smaller than the backbone modems (e.g., 40 cm long and less than 2.5 cm diameter as opposed to 2 meters long and 3.75 cm diameter) and utilize a smaller battery than the end node modems 135. Third, the end modems are adapted to have a low energy usage (sleep) mode. For example, the end modem may have a low-power sub-system which has only the functions of detecting a wake-up signal, and waking up the main system when it detects that wake-up signal, and the main system can have a sleep mode where battery is conserved. Fourth, the end modems may be coupled to the pipe string in the borehole in different ways. For example, the end modem may be attached to the pipe string. Alternatively, the end modem may be installed in a valve or other piece of equipment that is attached to the pipe string such that the end modem can command and monitor the valve. As another alternative, the end modem can be attached to a different element (e.g., a casing) where there is no solid path from the end modem to the hub modem, but there is a sufficient acoustic coupling via fluid.

Figure 4:
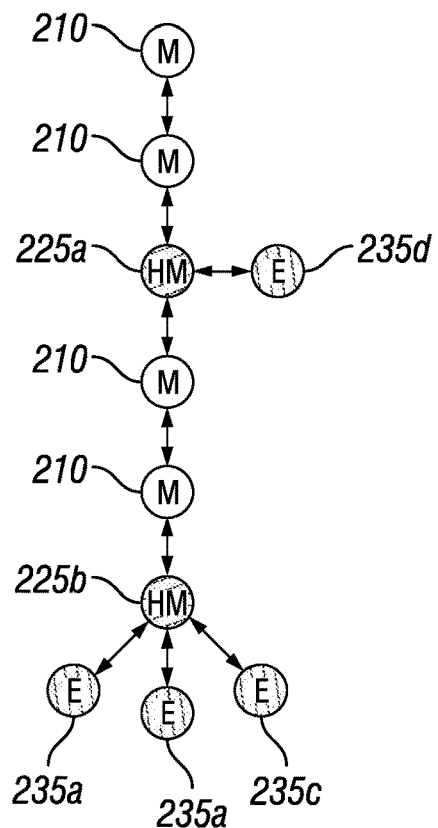
FIG. 4 is a schematic of another embodiment of a heterogeneous downhole acoustic network with backbone modems, multiple hub modems, and end node modems.

Turning to FIG. 4, another embodiment of a heterogeneous downhole acoustic network is seen with backbone modems 210, multiple hub modems 225a, 225b, and end node modems 235a-235d. Hub modem 225a is shown as located in the backbone between two backbone modems 210 and communicating with those modems as well as with an end modem 235d. Hub modem 225b is shown as located at the end of the backbone and communicating with a single backbone modem and multiple end modems 235a, 235b, and 235c. It will be appreciated that additional hub modems could be utilized wherever it is desirable for a backbone modem to be able to both participate in the backbone and also be able to communicate with an end modem. In fact, if desired, all backbone modems 210 in the network can be replaced by hub modems 225, although the hub modems typically will be more expensive than the backbone modems.

Figure 5:
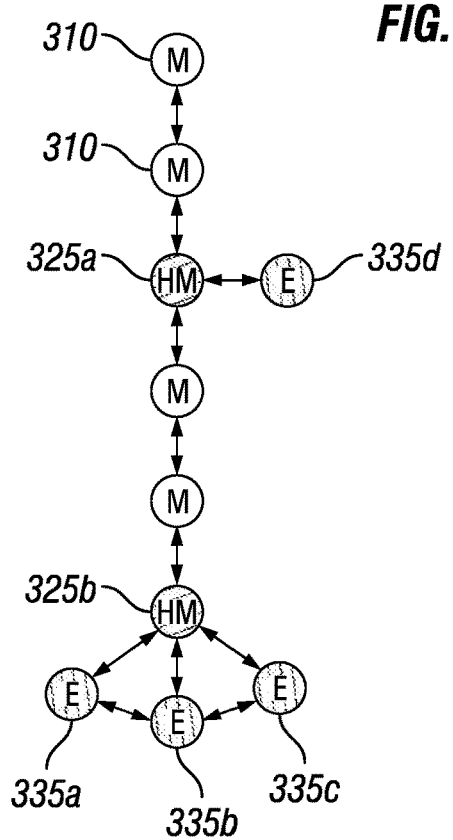
FIG. 5 is a schematic of another embodiment of a heterogeneous downhole acoustic network with backbone modems, hub modems, and a plurality of end node modems that can communicate amongst themselves and a hub modem.

FIG. 5 is a schematic of another embodiment of a heterogeneous downhole acoustic network with backbone modems 310, hub modems 325a, 325b (e.g., for redundancy), and a plurality of end node modems 335a-335d, with end modems 335a, 335b, and 335c being capable of communicating amongst themselves as well as with the hub modem 325b, thus effectively establishing a communications network separate from the backbone network. As previously mentioned, the end node modems communicate in a manner orthogonal to the communications in the backbone network so that there is no conflict. In one embodiment, communication among the end nodes is at a much higher frequency band than is used in the backbone network.

Figure 6:
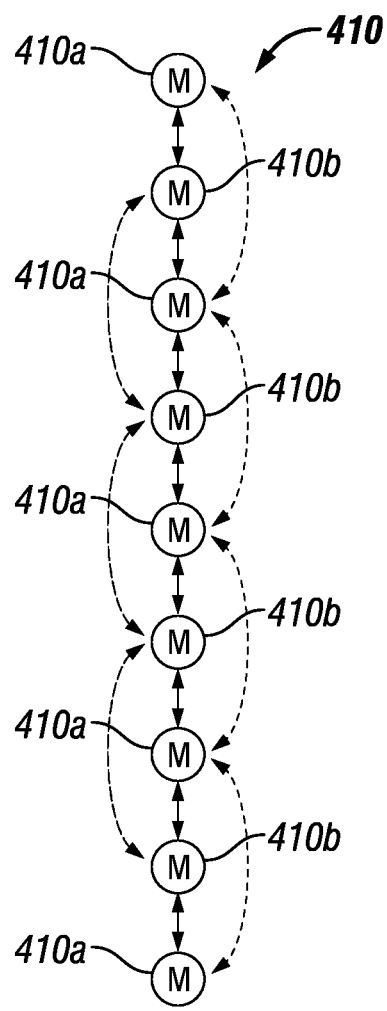
FIG. 6 is a schematic of a backbone network having simultaneous bidirectional communications without interference.

In one aspect, and as previously mentioned, it may be desirable for signals being transmitted from the surface downhole to be transmitted at the same time as signals from downhole are being transmitted to the surface. FIG. 6 is a schematic of a backbone network having simultaneous bidirectional communications without interference. In FIG. 6, backbone modems 410 are divided into two groups: modems 410a and modems 410b, with modems from each of the groups being interleaved with modems from the other of the groups. Thus, as shown in FIG. 6, every other modem of the backbone modems is from a first group, and then the other, thereby effectively establishing parallel networks. The signaling of the two parallel backbone networks is orthogonal so that there is no interference. For example, frequency multiplexing may be utilized. For redundancy purposes, each backbone modem 410 may be provided with two transducers, one for each frequency band, so that the backbone modems may be used as a single network or as parallel uplink and downlink networks. The bidirectional backbone network of FIG. 6 may be used in conjunction with hub modems and end node modems as previously described, with the end node modems communicating with the hub modem(s) which communicate with one or more of modems 410a and 410b. The end node modems communicate in a manner orthogonal to both backbone modem groups.

Figure 7:
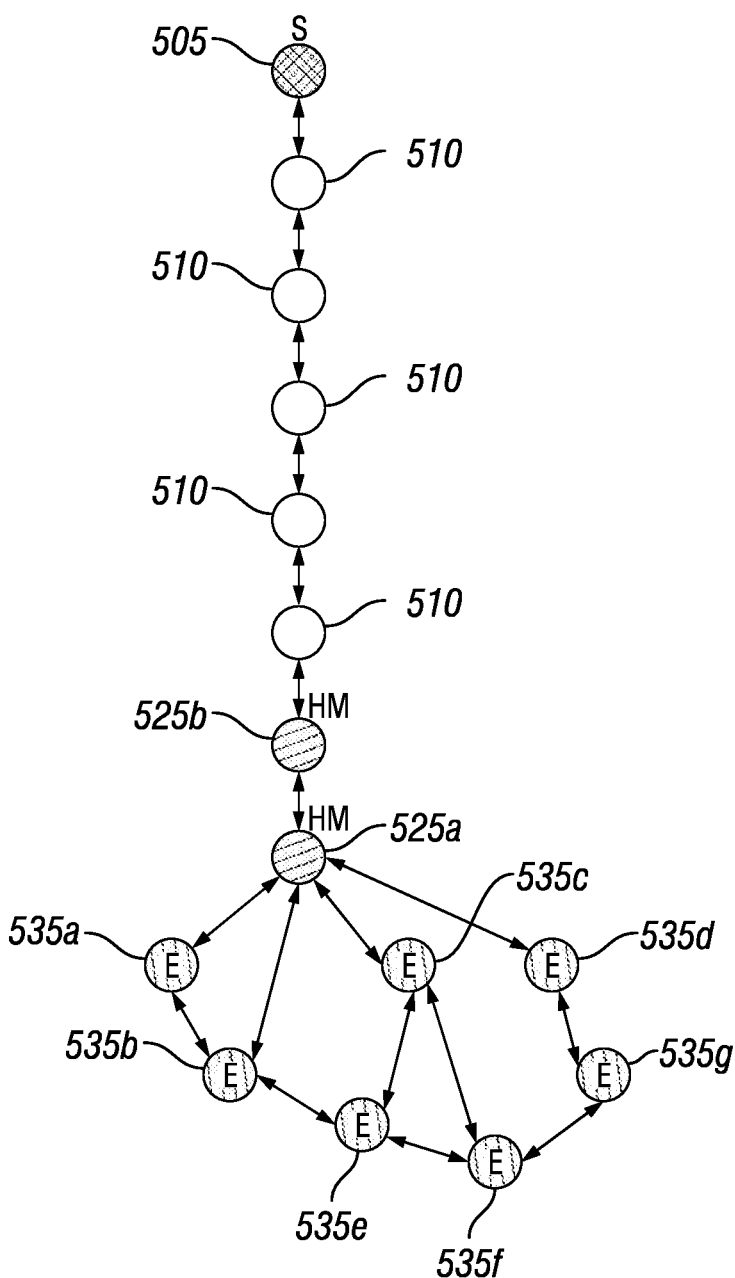
FIG. 7 is a schematic of another embodiment of a heterogeneous downhole acoustic network with backbone modems, hub modems, and a plurality of end node modems.

Turning to FIG. 7, a schematic is seen of another embodiment of a heterogeneous downhole acoustic network with a surface node 505, backbone modems 510, hub modems 525a, 525b, and a plurality of end node modems 535a-535g. Some of the end node modems such as modems 535e, 535f, and 535g are shown as communicating only with other end node modems (device to device communication) as opposed to also communicating with the hub 525 modem 525a, thereby establishing a local end node network. The surface node 505 can be directly connected to one or more computers, surface systems, or user interfaces. As previously suggested, the local nodes (modems 535a-535g) can only communicate within their local network or with the hub modem 525a. They are typically associated with sensors or actuators or are simple repeaters. If desired, local nodes can be implemented using some redundancy by adding extra modems in case of communication or hardware failure. For example, if one local node fails, a redundant local node can take over.

In the network of FIG. 7, the bridge hub 525a may be used as a controller for the local network of end node modems. For example, the bridge hub 525a can receive messages from the surface through the backbone network and pass the messages to the local nodes through the local network, or trigger a sequence of queries on the local network. The local nodes can then pass an answer back to the bridge hub for transmission via the backbone network to the surface.

In one embodiment, the local network can operate in a semi-autonomous or autonomous way. For example, the local network could be used to harvest data from the local nodes according to predefined automatic sequences. The automatic sequences would typically trigger scenarios of commands passed to the different local nodes. The commands could be linked to data acquisition from sensors connected to the local nodes and be used to harvest data from the local nodes and store them at the bridge hub level.

The bridge hub could also be used as a local network data concentrator for the data passed to it by the local nodes.

In one embodiment, a surface query for data from a local node would not necessarily trigger a request on the local node as the surface query could be addressed by querying the memory of the bridge hub which has been periodically updated with information from the local node.

In one embodiment, the sequence of queries on the local network by the bridge hub modem could be modified from the surface. In another embodiment, the bridge hub has local processing capability in order to modify the sequence of queries by itself through predefined algorithms autonomously defined. A change of query sequence could be triggered by local analysis of data harvested on the bridge hub. As an example, the bridge hub can manage priorities of the delivered information. If the information from a gauge 1 is more important than the information from gauge 2, the hub can coordinate the data delivery accordingly. Another example is to compress the data from multiple channels (e.g., gauges 1 and 2). Great efficiency of data compression can be achieved if the compression is performed for multiple measurements. Further details regarding managing prorities and priority procedures can be found in U.S. Patent Application Publication No. 2011/0050452 to Kusuma et al., which is hereby incorporated by reference herein in its entirety.

As previously indicated, the local and backbone networks communicate with each other through the bridge hub 525a. In one embodiment, the bridge hub includes a local modem and a backbone modem which are connected with wire or cable so that they can exchange information through any wire protocol. In another embodiment, the bridge hub includes a single modem capable of acting as a node in multiple orthogonal networks. In that configuration, the network may take into account that this modem may have to perform parallel decoding and parallel transmission. Thus, some acoustic message loss may have to be managed. For example, if the hub is transmitting on one network, it may not be able to receive messages from the other network. In that case, a retry strategy may be implemented as discussed hereinafter. In one embodiment, the network of the end node modems and the bridge hub modem operate independently of the backbone modem network.

In one embodiment, the end node modems may operate in three modes: hibernation (H), transmission (TX) and reception (RX). The hibernation mode is a low power mode designed so that most of the functions of the electronics of the end mode modem are switched off in order to reduce overall power consumption. In one hibernation mode, the end node modem does not track with an internal clock. For example, the modem may be provided with a wired link to a measurement tool (e.g., a pressure gauge) that awakens the modem. Thus, the gauge can run continuously acquiring pressure measurements under its own electronics with its own time reference. The gauge may be programmed to send a signal to the modem at relevant times with the signal causing the modem to awaken. In another hibernation mode, the end node modem requires proper tracking of an internal clock, often called a real-time clock (RTC). For example, if the end node modem must awaken periodically, it must keep track of a time stamp. More particularly, by providing a time reference t running throughout the tool operating time, the RTC is designed to manage the switch between the hibernation start to and a hibernation duration $\Delta t_H$. Possible wake states are described below and wake states. Thus, in one embodiment, the RTC is preprogrammed with a hibernation but are not limited to the ones described.

If the end node modem is not in hibernation mode, it is in an awake or "wake" state which consumes more power than the hibernation mode. One wake state is a transmission (TX) state where the end node modem can send wireless energy to the transmission medium (e.g., in order to send signals to communicate with other wireless devices). Communications signals typically involve the use of one or more carrier frequencies with proper modulation. Different modulation techniques include: amplitude modulation, frequency modulation, and phase modulation. More particularly, for digital communications, known modulation techniques include: ASK (Amplitude Shift Keying), FSK (Frequency Shift Keying), BPSK (Binary Phase Shift Keying), QPSK (Quadrature Phase Shift Keying), M-PSK (M-Phase Shift Keying), M-FSK (M-Frequency Shift Keying), QAM (Quadrature Amplitude Shift Keying), APSK (Amplitude and Phase Shift Keying), OFDM (Orthogonal Frequency Division Multiplexing), OOK (On-Off-Keying), CPM (Continuous Phase Modulation), MSK (Minimum Shift Keying), GMSK (Gaussian Minimum Shift Keying), CPFSK (Continuous Phase Frequency Shift Keying), DMT (Discrete Multi-Tone), TCM (Trellis Coded Modulation), DSSS (Direct-Sequence Spread Spectrum), CSS (Chirp Spread Spectrum), FHSS (Frequency Hopping Spread Spectrum), SIM (Subcarrier Index Modulation), DTMF (Dual Tone Multi Frequency), OQPSK (Offset Quadrature Phase Shift Keying), etc. Similar concepts also apply to transmission of analog signals. Known analog signal transmission techniques include AM (Amplitude Modulation), DSB (Double SideBand), SSB (Single SideBand), VSB (Vestigial SideBand), QAM (Quadrature Amplitude Modulation), FM (Frequency Modulation), PM (Phase Modulation), TM (Transpositional Modulation), etc. A communication signal can often be characterized by its frequency bandwidth between a minimum frequency $f_{min}$ and a maximum frequency $f_{max}$. The frequency band $\{f_{min}; f_{max}\}$ characterizes the spectral spread of the wireless signal.

Another wake state is a reception (RX) state. In the reception state, the end node modem can detect a wireless signal and/or decode a wireless signal. In the RX state, and in one embodiment, even while in hibernation mode, the end node modem has the ability to receive and analyze wireless energy which may include noise and/or a useful signal in order to cause the end node modem to change states. In one embodiment, this receipt and analysis ("wake method") is sufficiently robust to limit false detection (noise) and to avoid missing detection of the useful signal. Various algorithms are possible to provide such a robust wake method. As previously suggested, the wireless communication is usually accomplished via modulation of carrier frequencies and is characterized by a spectral spread $\{f_{min}; f_{max}\}$. Usual detection techniques will be based on detecting absolute energy, relative energy with background noise, or correlation in the $\{f_{min}; f_{max}\}$ bandwidth. In some cases, simple energy detection in the bandwidth of interest may not be robust enough to discriminate between a true communication signal and noise. A more complex detection method may be implemented based on frequency analysis, signal coherence, phase detection, or a combination of two or more of these in order to get a better discrimination between a useful signal and noise. It will be appreciated that several detection methods can be implemented and running in parallel and that the detection signal is not necessarily unique. The implementation of several detection methods can help to identify the type of signal that is being received.

In one embodiment, the detection of a wireless signal can be used to change the state of the wireless device. In addition, wireless signals can be used to trigger queries from device to device in order to monitor, control, or share information between devices.

Figure 8:
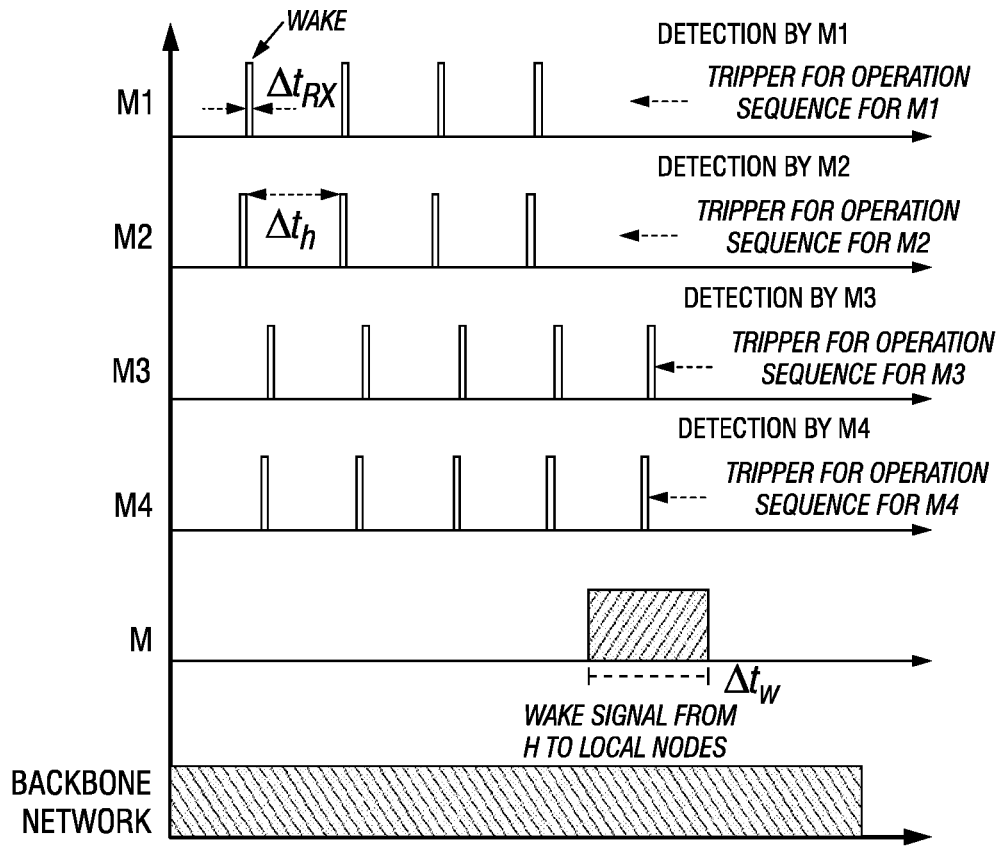
FIG. 8 is a schematic of a first signaling scheme for end node modems.

Turning now to FIG. 8, a schematic of a first signaling scheme for the end node modems having TX, RX and hibernation (H) modes is seen. The end nodes have a core sequence that includes a hibernation mode period $\Delta t_H$ and a receive period $\Delta t_{RX}$. In the receive period, the device is configured for at least wireless signal detection. This period is also referred to as micro-wake. The duty cycle is set such that $\Delta t_H \gg \Delta t_{RX}$. More particularly, assuming an average power consumption of $P_H$ and $P_{RX}$ for the respective states, the ratio $\Delta t_H/\Delta t_{RX}$ is chosen so that $\Delta t_H/\Delta tRx \geq P_{RX}|P_H$, thereby effectively reducing the overall power consumption throughout the operating period. The core sequence ($\Delta t_H$; $\Delta t_{RX}$) is repeated until a wireless signal is detected. The detection of a wireless signal triggers another operation sequence.

As seen in FIG. 8, a bridge hub signal (5$^{th}$ line of signals) is used to query local nodes and wake them up on demand. The bridge hub wake signal is a wireless signal specifically designed and used to be detected by the local node(s). Many different wake signals are possible depending upon the detection methods implemented in the end node modems. By way of example and not by way of limitation, the wake signal could be a simple time-bounded frequency tone which is easily detected through frequency analysis. In one aspect, it is useful if the implementation of the wake signal permits the local node to detect the wake signal robustly within the duration of the local node micro-wake $\Delta t_{RX}$, as is indicated in FIG. 8 where each of the four end nodes (top four lines of signals) has a core sequence micro-wake during the bridge hub wake signal.

In one embodiment, the bridge hub has the ability to send a wireless signal for the specific purpose of waking up the end node modems. In one embodiment, whenever a query of one of the local nodes (end node modems) is required, bridge hub sends a wake signal of a duration $\Delta t_{Wake} > \Delta t_H + \Delta t_{RX}$. According to one aspect, the duration of the wake signal is important for the robustness of the system, as in practice, the system can include several local nodes each with its own clock and time reference. Since clocks are known to drift over time, the time reference might shift among the local nodes (as suggested by the different micro-wake times for the end node modems in FIG. 8). By insuring that $\Delta t_{Wake} > \Delta t_H + \Delta t_{RX}$, it is possible to insure that each local node will have the ability to be in a micro-wake state upon receiving the wake signal regardless of its differential clock drift. Upon detection of the wake signal received from the bridge hub, the core sequence is stopped and the local nodes can switch to another state. The particular sequence of actions after the wake period will depend on the particular application of the system.

In one embodiment, after receiving a wake signal, the end node modems remain in a receive (RX) mode at least until the end of the wake signal.

In another embodiment, the end of the wake signal is used to synchronize the end node modems.

In another embodiment, upon completion of the wake signal, the end node modems remain in RX mode for at least a predetermined period of time and the bridge node modem may send messages to some or all of the end node modems.

In another embodiment, the communication from the bridge node modem to the end node modems after the wake signal is built around a dedicated protocol that manages the networking of the end node modems and bridge node modem.

In another embodiment, the end of the wake signal automatically triggers a predefined sequence of events amongst the end node modems.

In another embodiment, the end of the wake signal triggers a communication sequence from each of the end node modems to the bridge hub modem.

In another embodiment, after the end node modems are awakened, communication among the nodes is managed using time division multiplexing (TDM) techniques.

In another embodiment, upon completion of sequences of action triggered by the wake signal, the end node modems go back to their core sequences of hibernation mode and micro-wake mode.

In another embodiment, multiple (N) types of wake signals are provided, and each type of wake signal may be associated with a specific operation sequence. According to one aspect, if end node modems have the ability to detect and identify multiple wake signals, the specific type of wake signal utilized may be used as a way of passing information to the end node modems via the wake signal.

Figure 9:
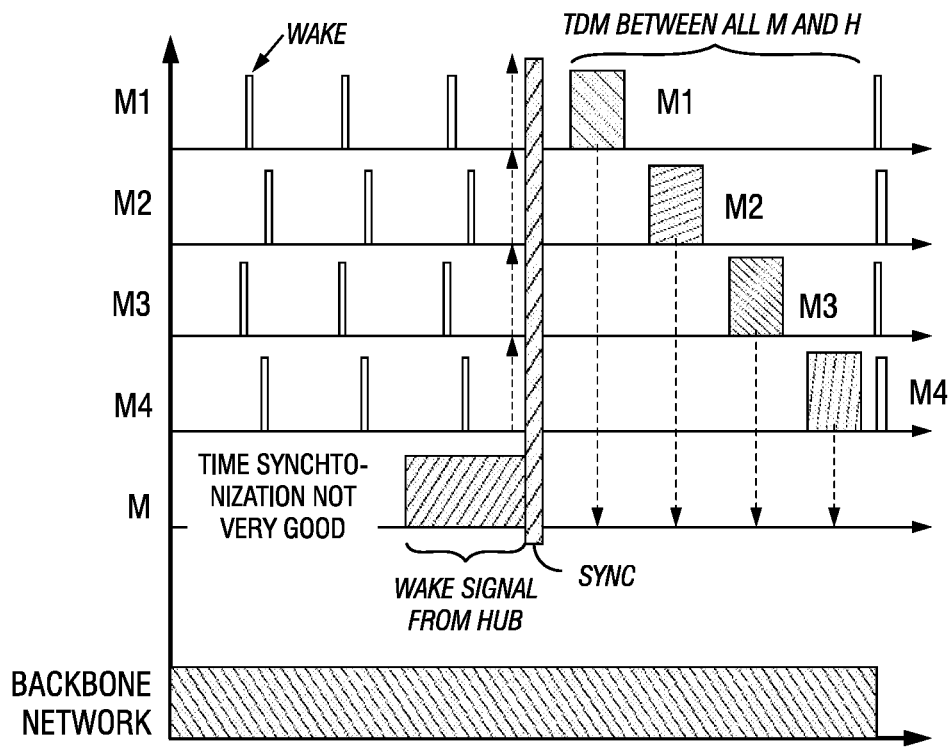
FIG. 9 is a schematic of another signaling scheme for end node modems utilizing a synchronization signal.

In other embodiments, combinations of two or more non-conflicting previously described embodiments may be utilized. For example, FIG. 9 shows multiple end node modems in their core sequence (hibernation-micro-wake-hibernation-micro-wake, etc.) until a wake signal (fifth signal line) is received from the hub modem. The end of the wake signal acts as a SYNC signal where all of the end node modems are synchronized, and then a communication sequence is triggered. As seen in FIG. 9, the communication sequence uses time division multiplexing where information is transmitted sequentially (i.e., in dedicated time slots) from the individual end mode modems to the bridge hub modem. Upon completion of the communication sequence, the local nodes return to their core sequences which, at least initially are synchronized.

Figure 10:
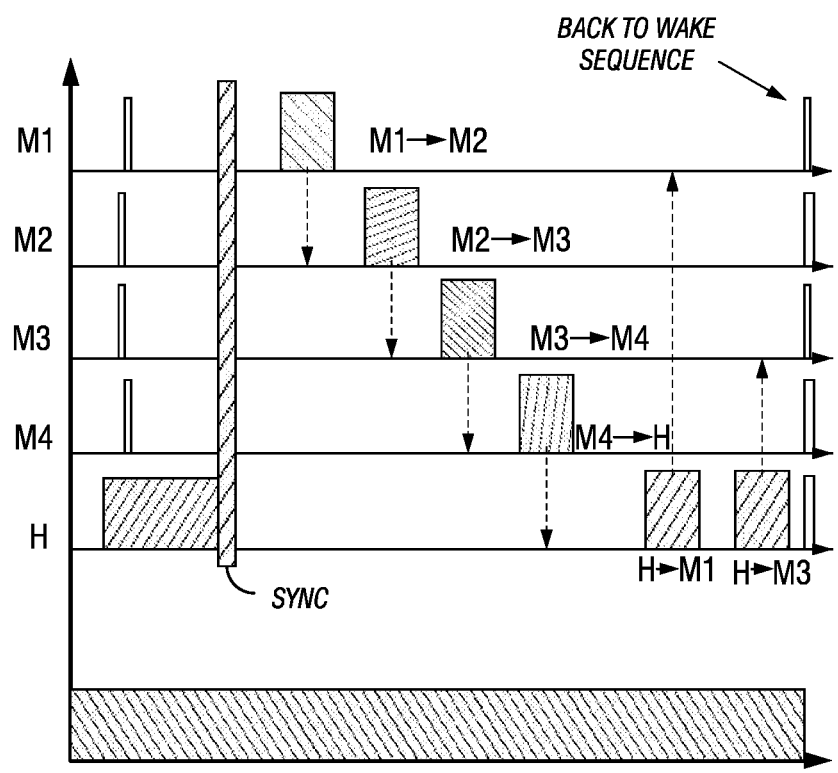
FIG. 10 is a schematic of another signaling scheme for end node modems.

FIG. 10 is a schematic of another signaling scheme for end node modems where the end node modems are configured as a network of repeaters. Initially, the end node modems are in their core sequence (shown as being out of synchronization). At the end of the wake signal from the hub modem, and in a first defined time slot, an end node modem M1 initiates a communication intended for the bridge hub modem from itself to a next (repeater) modem M2. In a next time slot, the repeater end node modem M2 sends the information it received from M1 to M3. In a next time slot, repeater end node modem M3 sends that same information to M4. Then, repeater end node modem M4 sends that information to the bridge hub modem. Thereafter, the bridge hub modem sends a message directly to modem M1 followed by a message to modem M4. Upon completion of the communication sequence, the end node modems return to their core sequences, which at least initially are synchronized.

While the embodiments of FIGS. 9 and 10 utilize a synchronization signal from the bridge hub modem for waking up the local end node modems, other embodiments described hereinafter with respect to FIGS. 11-14 do not rely on synchronization initiated by the hub modem. Rather, these embodiments rely on an independent wake-up of the local end node modems. In these embodiments, the default mode of the end node modems is hibernation. The end node modems are awakened by end devices. The end devices decide on their own when to send data. When an end device decides to send data, the end device wakes up its local end node modem, and then the end modem sends one or more packets of information to the bridge hub. These embodiments may be described as "on-demand access" embodiments.

It will be appreciated that if two or more local end node modems send messages at the same time, there is a risk of interference. To reduce the occurrence of interference, in one embodiment, the end node network utilizes a random access method where, upon sensing a possible conflict, an end node modem will wait a random period of time before (re)sending its message.

Figure 11:
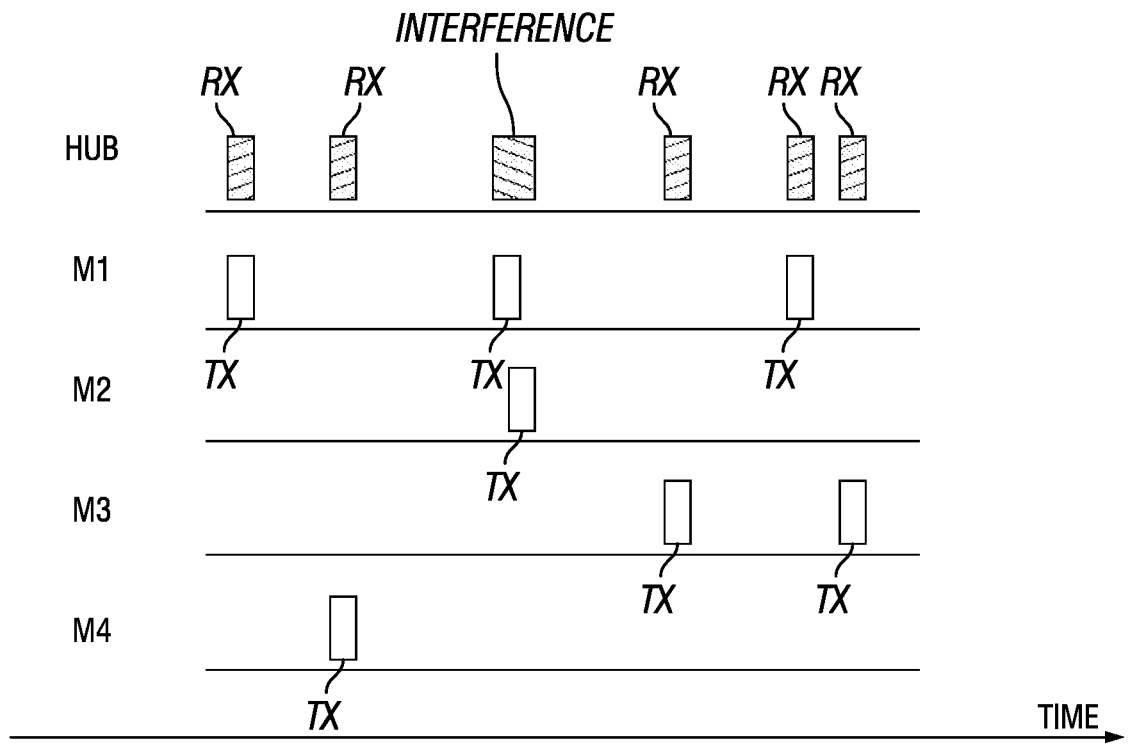
FIG. 11 is a schematic of an on-demand-access-to-channel signaling scheme.

FIG. 11 is a schematic of a first embodiment of an on-demand-access-to-channel signaling scheme. In the scheme of FIG. 11 it is assumed that the end node modems utilize the same bandwidth so that if more than one message is sent at the same time, the messages are lost. Thus, where modems M1 and M2 send messages at the same time (interference period) as seen in FIG. 11, the messages are lost. In addition, it is assumed that the local nodes do not share synchronized clock reference so that packets may not be sent by the local nodes in a synchronized manner. In the scheme of FIG. 11, the local end node modems are in hibernation mode by default. When a device needs to send a packet of information, the local node wakes up the local end node modem which transmits the packet of information. Then the end node modem goes back to its hibernation mode. In the scheme of FIG. 11, the end node modems do not have an RX mode or function. As a result, the modem architecture may be simplified and power consumption may be kept to a minimum.

In the scheme of FIG. 11, the devices randomize the time to send a message. Typically, prior to operation, the user would specify the average querying time T of each device. The hibernation time between two messages to be sent follows a random distribution. Typically, a Poisson process is used. When a Poisson process is used, the hibernation time follows an exponential distribution with a parameter (1/T), with a probability function given by $f(t,T)=1/T \exp(-t/T)$. If a Poisson process is not used, the hibernation time may follow a normal distribution with mean T or some other distribution. The reliability of the network may be calculated based upon the random process utilized. Assuming a Poisson process, the likelihood of losing a packet due to interference is given by $(1-\exp(-2G))$ where G is the channel occupancy (i.e., the number of frames per time unit). The throughput is given by $G \times \exp(-2G)$. The throughput is optimized with an occupancy of 0.5.

Figure 12:
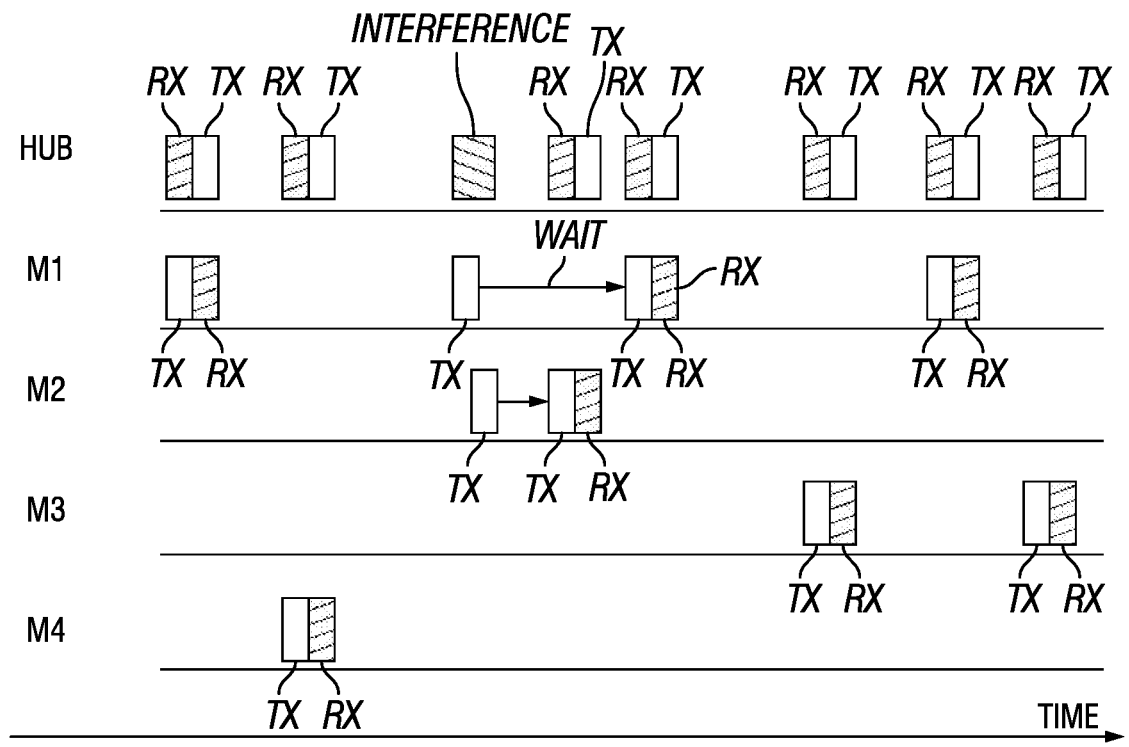
FIG. 12 is a schematic of an on-demand-with-random-duplication-access-to-channel signaling scheme.

A second on-demand transmission scheme is seen in FIG. 12. In FIG. 12, as in the arrangement of FIG. 11, it is assumed that the end node modems utilize the same bandwidth so that if more than one message is sent at the same time, the messages are lost. However, in FIG. 12, the transmission scheme utilizes random duplication in order to reduce the likelihood of losing information. Thus, as seen in FIG. 12, after sending a message, in all cases, a modem waits a random period of time and then resends the message. The random period of time may be determined by a uniform distribution or by other mechanisms. As a result, where modems M1 and M2 send messages at the same time (interference period), the messages are not ultimately lost, as both modems M1 and M2 wait random periods of time as seen in FIG. 12 to resend their messages which are resent at different times and received by the hub without interference. Similarly, while modems M1 and M3 are shown interfering at one point in time (i.e., the duplicate message of M1 that interferes with the original message of M3), both messages are actually received by the hub as the original message of M1 is received by the hub and the duplicate message of M3 is received by the hub. In the scheme of FIG. 12, the local end node modems are in hibernation mode by default. When a device needs to send a packet of information, the local node wakes up the local end node modem which transmits the packet of information, waits a random period of time, and then resends the packet of information. Then, the end node modem goes back to its hibernation mode. In the scheme of FIG. 12, the end node modems do not have an RX mode or function. As a result, the modem architecture may be simplified and power consumption may be kept to a minimum.

Figure 13:
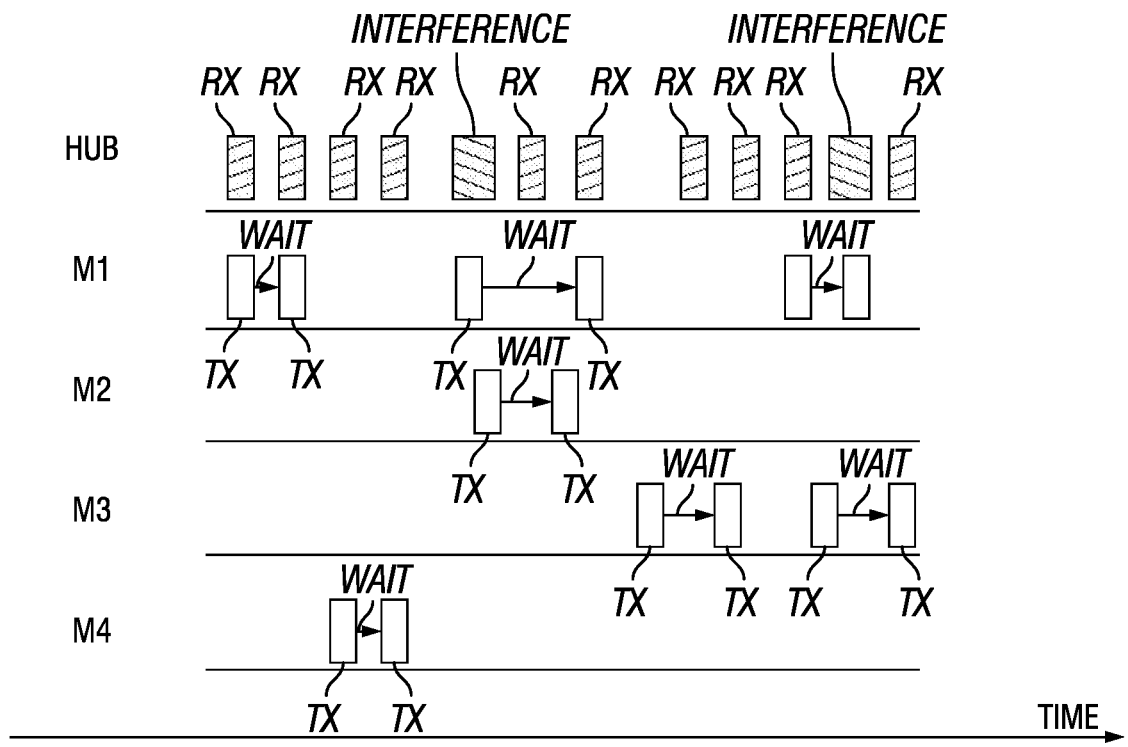
FIG. 13 is a schematic of an on-demand-access-to-channel signaling scheme with acknowledgement.

FIG. 13 is a schematic of an on-demand-access-to-channel signaling scheme with acknowledgement. This implementation builds upon the on-demand access to channel signaling scheme of FIG. 11, but adds a transmission of acknowledgement by the hub modem to the end node modem after receipt by the hub of a message from the end node modem. If an acknowledgement is not received by the end node modem, the end node modem accesses the channel randomly and resends (duplicates) the message. This embodiments requires the end node modem to have a RX capability.

More particularly, as seen in FIG. 13, end node modem M1 transmits a new message which is received by the hub modem, which in turn sends an acknowledgement which is received by modem M1. Some time later, modem M4 transmits a new message which is received by the hub modem, which in turn sends an acknowledgement which is received by modem M4. Some time later modem M1 transmits a new message and overlapping the time period of the M1 message, modem M2 starts transmitting a message, thereby causing interference between the messages. When modems M1 and M2 do not receive acknowledgements from the hub modem, they each wait a random period of time before sending a duplicate message. The random period of time for M2 is shown in FIG. 13 to be shorter than the random period of time for M1. Thus, M2 resends its message (after its random period) which is received by the hub modem, which in turn sends an acknowledgement which is received by modem M2. Then, M1 resends its message (after its random period) which is received by the hub modem, which in turn sends an acknowledgement which is received by modem M1. Some time later, modem M3 transmits a new message which is received by the hub modem, which in turn sends an acknowledgement which is received by modem M3, followed by a new message from modem M1 and an acknowledgement, followed by a new message from modem M3 and an acknowledgement, etc. It will be appreciated that, in some embodiments, this signaling scheme guarantees lossless communication.

In one embodiment, the acknowledgement signals sent from the hub to the end mode modems may be used to send downlink commands from the hub modem to the local node.

Figure 14:
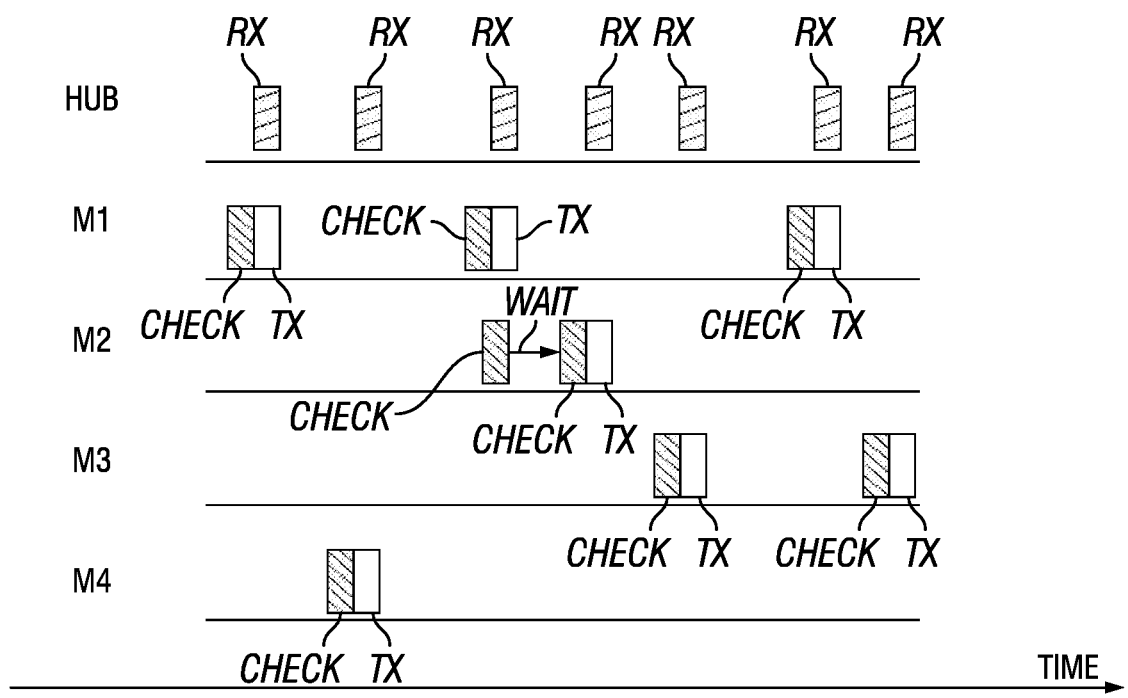
FIG. 14 is a schematic of an on-demand-access-to-channel-with-listen-to-check-and-random-access-in-case-of-occupied-channel signaling scheme.

FIG. 14 is a schematic of another on-demand-access-to-channel signaling scheme. In the signaling scheme of FIG. 14, before sending a message, end node modems "listen" to the network by probing the acoustic channel to check for occupancy (e.g., by connecting to the acoustic channel for a sufficient period of time to be able to detect an acoustic message being carried by the channel if that message is present). If the channel is not occupied, the end node modem sends a packet of information. If the channel is occupied, the local node delays transmission by a random period of time and then rechecks the channel to see whether the channel is occupied. Thus, as seen in FIG. 14, end node modem M1 checks for channel occupancy and then transmits a new message which is received by the hub. Sometime later, end node modem M4 checks for channel occupancy and then transmits a message which is received by the hub. Sometime later, modem M1 checks for channel occupancy and then transmits a message which is received by the hub. As modem M1 is transmitting a message, end node modem M2 checks for channel occupancy. Seeing that the channel is occupied, modem M2 waits a random period of time, checks again for channel occupancy and then, seeing that the channel is free, sends a new message which is received by the hub. Sometime later, modem M1 checks for channel occupancy and then transmits a message which is received by the hub. After that, modem M3 checks for channel occupancy and then transmits a message which is received by the hub. It will be appreciated that this signaling scheme approaches lossless communication. It will also be appreciated that, in some embodiments of this signaling scheme, the end node modems do not need the full decoding capability. As a result, the modem architecture may be simplified and power consumption may be kept to a minimum.

In one embodiment, the on-demand-access-to-channel-with-listen-to-check-and-random-access-in-case-of-occupied-channel signaling scheme of FIG. 14 also provides for acknowledgements to be sent from the hub to the end node modems for verification purposes. In such cases, the end node modems will have an RX mode and function. In one embodiment, the acknowledgement signals sent from the hub to the end mode modems may be used to send downlink commands from the hub modem to the local node.

Regardless of the specific signaling scheme of the end modem network and the specific signaling scheme of the backbone modem network, it will be appreciated that, in many embodiments, messages may be sent from the end modem network to the formation surface (and, where appropriate, the formation surface to the end modem network) according to a method in a more expeditious manner than previously. More particularly, since the end modem network operates with a signaling scheme that is orthogonal to the signaling scheme of the backbone network, in certain embodiments, messages in the respective networks can be transmitted simultaneously, and messages can be moved from network to the other through the bridge hub modem.

More particularly, and by way of example only, all modems in the system may be provided with unique addresses. Where a sensor (end node) is provided downhole for the purpose of sending regular readings uphole, the sensor may be hard-wired to an end node modem. Whenever the sensor provides a signal (e.g., a series of voltage pulses) to the end node modem, the end node modem may wake up and send the information (in raw or processed form) to the hub modem using a signal in the frequency or frequency range of the end modem network. The information may be accompanied with a destination address (a surface modem). Alternatively, the end node modem may be programmed to accumulate the signals over a period of time and then send the information (in raw or processed form) to the hub modem with the destination address. The hub modem, in turn, seeing the destination address, may then send the information it receives from the end node modem (in raw or processed form) over the backbone network using a signal in the frequency or frequency range of the backbone network (which is orthogonal to the end node modem signaling). Where the backbone network has modems arranged in a single network, the signal from the hub modem is sent, received by the next modem, and then sent by that modem to the next modem, etc., until the signal reaches the surface modem. On the other hand, where the backbone network includes orthogonal uplink and downlink networks, the signal from the hub modem is sent to an uplink backbone modem, which receives the signal and sends it to the next uplink modem, etc., until the signal reaches the surface modem.

In one aspect, a surface modem is considered an entry point of the user to the acoustic network. The surface modem is able to communicate with a surface computer in either a wired or wireless manner. In some embodiments, the surface modem is not necessarily located close to the surface as a long cable might be used to connect the surface modem to a rig on the surface.

Also, by way of example only, where it is desired to send a signal from the surface to a sensor, a surface modem is provided with a destination address in conjunction with the signal. The signal and address are provided to a backbone modem (which in the case of uplink and downlink networks would be a downlink backbone modem) in the frequency or frequency range of the backbone network, and the backbone modem reads the signal and address and forwards the signal with the address to the next backbone modem. The process is repeated until the message arrives at the hub modem. At that point, the message is sent to the destination (e.g., end node modem) in the frequency or frequency range of the end node modem network which is orthogonal to the backbone modem network frequency or frequency range.

In one aspect, because the end node modems utilize a hibernation mode where the modem utilizes very little power, the batteries powering the end node modems can last many times longer than the end node modem batteries used in the prior art.

In one aspect, some of the methods and processes described above, such as (by way of example and not by way of limitation) calculation of random wait times and random hibernation times are performed by a processor or a plurality of processors. In addition, some of the apparatus described above, such as the modems include processors. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Thus, by way of example only, and not by way of limitation, while various embodiments describe two networks that use signaling which is orthogonal one relative to the other, it will be appreciated that systems having more than two orthogonal networks could be utilized. For example, a system might have a backbone network with at least two hub modems, where each of the hub modems is coupled to its own "local" network of end node modems which communicate with signaling that is orthogonal relative to the backbone and which is orthogonal relative to the other local network. Also, while various embodiments describe particular communication schemes, including some schemes utilizing synchronization and other schemes utilizing on-demand signaling, it will be appreciated that other communication schemes can be utilized. Accordingly, all such modifications are intended to be included within the scope of this disclosure as defined in the following claims.

What is claimed is:

1. An acoustic network located in a formation traversed by a borehole having a pipe contained therein, the network comprising:
    a backbone network having a plurality of backbone modems engaging the pipe and acoustically communicating along the pipe using a first modulation technique, wherein the backbone modems are acoustic modems, wherein the backbone modems comprise a first set of modems comprising an uplink network and a second set of modems comprising a downlink network, the first set of modems being interleaved with the second set of modems, and wherein the uplink network and the downlink network have orthogonal signaling schemes providing for simultaneous bidirectional communications without interference; and
    a plurality of end node modems acoustically communicating using a second modulation technique orthogonal to the first modulation technique, wherein the end node modems are acoustic modems, wherein at least one of the backbone modems is a bridge hub modem that is coupled to both the backbone network and to at least two of the plurality of end node modems, wherein the bridge hub modem is an acoustic modem and communicates with the backbone network using the first modulation technique and with the at least one end node modem using the second modulation technique.

2. The acoustic network of claim 1, wherein the plurality of end node modems operate in a plurality of modes including (i) a hibernation mode defined by low energy usage with no transmission or receipt of data and (ii) a transmission (TX) mode defined by transmission of data by the end node modem.

3. The acoustic network of claim 2, wherein
    (i) the backbone modems comprise transmitter and receiver electronics, a processor, a battery of a first size and first capacity,
    (ii) the end node modems comprise a transmitter, a processor, and battery of a second size and second capacity, and
    (iii) the battery of a first size and first capacity is larger in size and larger in capacity than the battery of a second size and second capacity.

4. The acoustic network of claim 2, wherein the first modulation technique and the second modulation technique utilize time division multiplexing.

5. The acoustic network of claim 2, wherein
    (i) the plurality of end nodes modems form an end node network, and
    (ii) the end node network uses a protocol where the plurality of end node modems enter the TX mode and transmit messages to the bridge hub modem whenever the plurality of end node modems have messages to transmit.

6. The acoustic network of claim 5, wherein the protocol includes a random duplication such that each of the end node modems after transmitting a message waits a period of time and then transmits the same message again to the bridge hub modem.

7. The acoustic network of claim 2, wherein the plurality of modes includes a reception (RX) mode defined by reception of data by the end modem.

8. The acoustic network of claim 7, wherein
    (i) the plurality of end node modems form an end node network, and
    (ii) the end node network uses a protocol with acknowledgement signaling where (a) each end node modem enters the TX mode and transmits messages to the bridge hub modem whenever that end node modem has a message to transmit, (b) the hub bridge modem sends an acknowledgement signal to the end node modem that has sent a message, and (c) if the end modem that has sent a message does not receive the acknowledgement, that end modem waits a random period of time and then transmits the same message again to the bridge hub modem.

9. The acoustic network of claim 7, wherein
    (i) the plurality of end node modems form an end node network, and
    (ii) the end node network uses a protocol with channel occupation checking where, each end node modem prior to sending a message determines whether another modem is sending a message, and, if so, that end node modem waits a period of time and determines again whether a different modem is sending a message, and if no messages are being sent by other end node modems, that end node modem enters the TX mode and transmits a message to the bridge hub modem.

10. The acoustic network of claim 7, wherein the plurality of end node modems form an end node network and the bridge hub modem sends a wakeup signal to the end node modems to cause the end node modems to exit a hibernation mode.

11. The acoustic network of claim 10, wherein the wakeup signal causes the end node modems to synchronize.

12. The acoustic network of claim 11, wherein, after the wakeup signal, the end node modems send messages to the bridge hub modem in a time division multiplexed manner.

13. The acoustic network of claim 10, wherein
    (i) each the end node modem uses a core sequence of (a) hibernation followed by (b) a micro-wake state where the end node modem is able to determine whether or not the end node modem is receiving a wakeup signal, and (ii) the core sequence repeated until the wakeup signal is received from the bridge hub modem.

14. The acoustic network of claim 13, wherein the microwake state has a first length of time and the hibernation state has a second length of time, the second length of time being greater than the first length of time.

15. The acoustic network of claim 14, wherein the wakeup signal has a length of time at least equal to a sum of the first length of time and the second length of time.

16. The acoustic network of claim 1, wherein the first modulation technique is at a first frequency band and the second modulation technique is at a second frequency band orthogonal to the first frequency band.

17. A method of communicating information acoustically between a surface of a formation and a downhole apparatus via an acoustic network located in the formation traversed by a borehole having a pipe contained therein, the method comprising:
providing (i) a backbone network having a plurality of backbone modems engaging the pipe and acoustically communicating along the pipe utilizing a first modulation technique and (ii) a plurality of end node modems acoustically communicating utilizing a second modulation technique orthogonal to the first modulation technique, wherein the backbone modems are acoustic modems, wherein at least one of the backbone modems is a bridge hub modem that is coupled to both the backbone network and to at least two of the plurality of end node modems, wherein the bridge hub modem is an acoustic modem and the end node modems are acoustic modems, wherein the backbone modems comprise a first set of modems comprising an uplink network and a second set of modems comprising a downlink network, the first set of modems being interleaved with the second set of modems, and wherein the uplink network and the downlink network have orthogonal signaling schemes providing for simultaneous bidirectional communications without interference;
sending an acoustic signal containing first information from an end node modem coupled to the downhole apparatus to the bridge hub modem using the second modulation technique; and
acoustically sending the first information from the bridge hub modem up the backbone network to the surface using the first modulation technique.

18. The method of claim 17, wherein
(i) the end node modems operate in a plurality of modes including a hibernation mode defined by low energy usage with no transmission or receipt of data and a transmit (TX) mode defined by transmission of data by the end node modem, and
(ii) the sending the first information from an end modem to the bridge hub modem comprises causing the end node modem to awaken from hibernation prior to transmitting.

19. The method of claim 18, wherein the causing the end modem to awaken comprises sending a wakeup signal from the bridge hub modem to the end node modem coupled to the downhole apparatus to cause that end node modem to exit its hibernation mode prior to the sending the first information.

20. The method of claim 19, wherein the plurality of end node modems form an end node network and the bridge hub modem sends a wakeup signal to the plurality of end node modems to cause the plurality of end node modems to exit a hibernation mode and to synchronize the plurality of end node modems.

21. The method of claim 20, wherein, after the wakeup signal, the plurality of end node modems send messages to the bridge hub modem in a time division multiplexed manner.

22. The method of claim 18, wherein
(i) the causing the end node modem to awaken comprises sending a wakeup signal from the downhole apparatus to the end node modem, and
(ii) the sending an acoustic signal containing the first information from an end node modem to the bridge hub modem using the second modulation technique comprises sending the acoustic signal on-demand.

23. The method of claim 22, wherein the sending an acoustic signal containing the first information from an end node modem to the bridge hub modem using the second modulation technique further comprises causing the end node modem to wait a period of time after the sending the acoustic signal on-demand, and then resending the acoustic signal.

24. The method of claim 22, wherein the sending an acoustic signal containing the first information from an end node modem to the bridge hub modem using the second modulation technique further comprises:
(i) causing the end node modem to await receipt of an acknowledgement signal from the hub, and
(ii) upon not receiving the acknowledgement signal, waiting a period of time after the sending the acoustic signal on-demand, and
(iii) then resending the acoustic signal.

25. The method of claim 17, further comprising:
sending an acoustic signal containing second information down the backbone network to the bridge hub modem using the first modulation technique; and
sending the second information from the bridge hub modem to the downhole apparatus via at least one of the end node modems using the second modulation technique.

26. A method according to claim 25, wherein
(i) the end node modems operate in a plurality of modes including a hibernation mode defined by low energy usage with no transmission or receipt of data and a receive (RX) mode defined by receipt and processing of data by the end node modem, and
(ii) the sending the second information from the bridge hub modem to the downhole apparatus comprises sending a wakeup signal from the bridge hub modem to an end node modem coupled to the downhole apparatus to cause the end node modem coupled to the downhole apparatus to exit its hibernation mode prior to the sending the second information.

* * * * *